US011374691B2

(12) United States Patent
Saloni et al.

(10) Patent No.: US 11,374,691 B2
(45) Date of Patent: Jun. 28, 2022

(54) ADAPTIVE BLOCK ACKNOWLEDGEMENT NEGOTIATIONS

(71) Applicant: Hewlett Packard Enterprise Development LP, Houston, TX (US)

(72) Inventors: Shubham Saloni, Santa Clara, CA (US); Wei Hu, Santa Clara, CA (US); Manoj Thawani, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 40 days.

(21) Appl. No.: 16/941,977

(22) Filed: Jul. 29, 2020

(65) Prior Publication Data
US 2022/0038212 A1 Feb. 3, 2022

(51) Int. Cl.
*H04L 1/16* (2006.01)
*H04L 67/141* (2022.01)
*H04W 84/12* (2009.01)
*H04W 88/08* (2009.01)

(52) U.S. Cl.
CPC .......... *H04L 1/1621* (2013.01); *H04L 67/141* (2013.01); *H04W 84/12* (2013.01); *H04W 88/08* (2013.01)

(58) Field of Classification Search
CPC .... H04L 1/1621; H04L 67/141; H04W 84/12; H04W 88/08
See application file for complete search history.

(56) References Cited

U.S. PATENT DOCUMENTS

| 10,251,085 | B2 | 4/2019 | Kim et al. | |
|---|---|---|---|---|
| 2014/0153416 | A1* | 6/2014 | Brandes | H04L 1/1685 370/252 |
| 2017/0055300 | A1* | 2/2017 | Pitchaiah | H04L 1/1621 |
| 2017/0245203 | A1* | 8/2017 | Cariou | H04W 48/14 |
| 2017/0310446 | A1* | 10/2017 | Asterjadhi | H04L 1/1864 |
| 2017/0331734 | A1* | 11/2017 | Cariou | H04L 1/1614 |

(Continued)

OTHER PUBLICATIONS

Abdelalim, K., et al., Adaptive Negotiation for Block Acknowledgment Session Management, Sep. 13, 2019, 6 Pgs.

(Continued)

*Primary Examiner* — Redentor Pasia
(74) *Attorney, Agent, or Firm* — Hewlett Packard Enterprise Patent Department

(57) ABSTRACT

Examples of block acknowledgement negotiations are described. In an example, a request to establish a BA session is sent by a first computing device (first device) to a second computing device (second device). A timer for receipt of a response to the request is initialized. A BA successful response is received by the first device after the timer has timed out. A request to terminate the BA session is sent by the first device to the second device. After sending the request to terminate the BA session, BA negotiation is reinitiated by the first device based on an updated inactivity timer, so that there are greater chances of successfully establishing a BA session. In an example, if the second device ignores the request to terminate the BA session then it sends a BA reject response to the first device. After receiving the BA reject response, the first device waits for the inactivity timer before reinitiating BA negotiations, so that the second device clears its states thereby increasing chances of successful BA renegotiations.

14 Claims, 6 Drawing Sheets

(56) References Cited

U.S. PATENT DOCUMENTS

| | | | |
|---|---|---|---|
| 2018/0026752 A1* | 1/2018 | Andonieh | H04L 1/1628 |
| | | | 370/338 |
| 2019/0268099 A1* | 8/2019 | Chu | H04L 1/1621 |
| 2019/0288798 A1* | 9/2019 | Jiang | H04L 1/1896 |
| 2021/0111836 A1* | 4/2021 | Huang | H04L 1/1835 |
| 2021/0143951 A1* | 5/2021 | Chu | H04L 5/0044 |
| 2021/0212142 A1* | 7/2021 | Patil | H04L 1/188 |

OTHER PUBLICATIONS

CWAP—802.11 : Block Ack (Webpage), Retrieved Jul. 1, 2020, 16 Pgs.

Henderson, T., Bug 2470—handshake to setup the Block Ack Agreement is not protected (Webpage), Aug. 7, 2016, 12 Pgs.

\* cited by examiner

ADAPTIVE BLOCK ACKNOWLEDGEMENT NEGOTIATIONS

BACKGROUND

A computer network includes a variety of network devices, such as access points, controllers, gateways, switches, etc., which perform different networking operations, such as network access, authentication, and routing network traffic to provide connectivity. A Wireless Local Area Network (WLAN) may include a plurality of Access Points (APs), as elements of the WLAN. These APs may be deployed in a network.

Client devices, such as laptops, personal computers, smartphones, etc. connect to network devices to exchange data with the network. The client devices and network devices may interact using different protocols and standards. The Institute of Electrical and Electronics Engineers (IEEE) publish many specifications for use in wireless communications under the 802.11 standard family, 802.11 continues to evolve in an attempt to address all challenges presented with proliferation of wireless devices.

BRIEF DESCRIPTION OF DRAWINGS

The present disclosure, in accordance with one or more various embodiments, is described in detail with reference to the following figures. The figures are provided for purposes of illustration only and merely depict typical or example embodiments.

Figure 1:
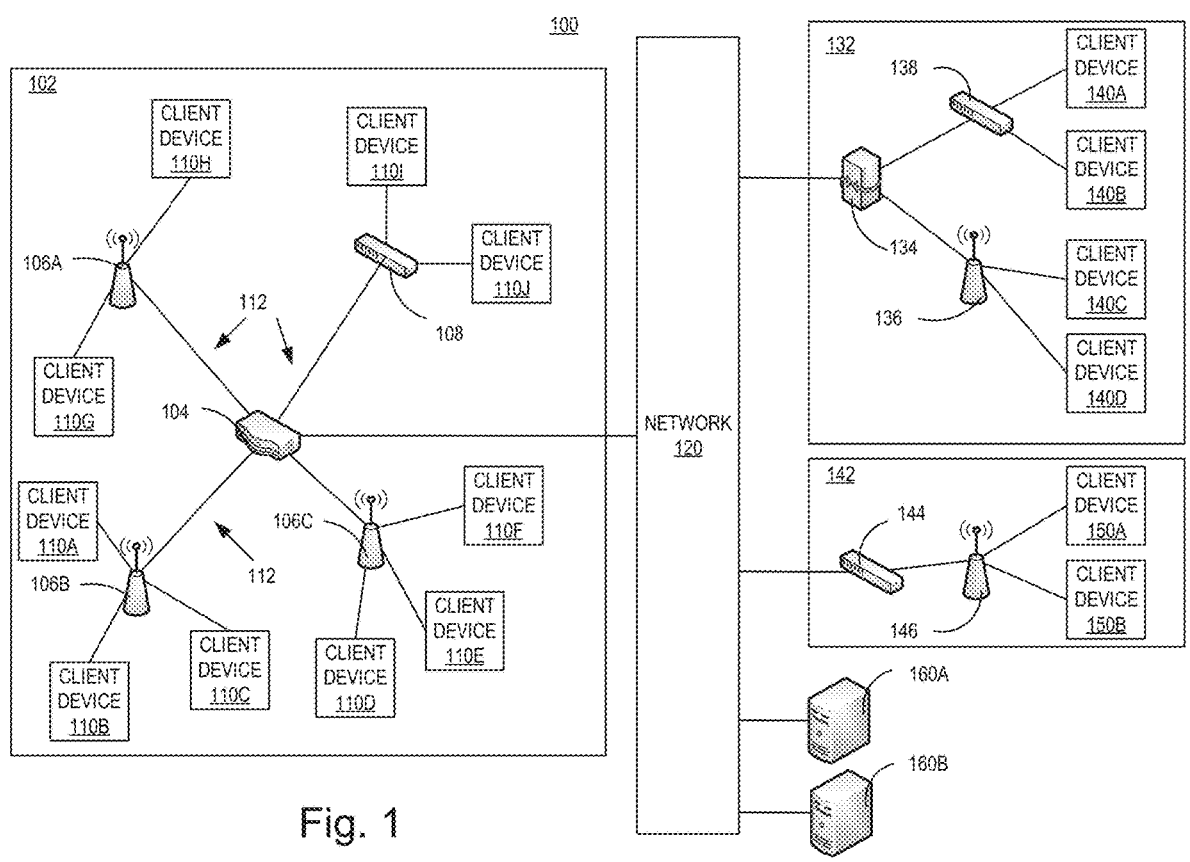
FIG. 1 illustrates an example of a network configuration that may be implemented for an organization, such as a business, educational institution, governmental entity, healthcare facility or other organization.

The figures are not exhaustive and do not limit the present disclosure to the precise form disclosed.

DETAILED DESCRIPTION

Aggregation of multiple data frames (also known as frame aggregation) by sending two or more data frames in a single transmission may facilitate in increasing throughput. Frame aggregation is a feature of the IEEE 802.11e, 802.11n and 802.11ac WLAN standards. Every data frame transmitted by a client device or a network device may have a significant amount of overhead, such as radio level headers, media access control (MAC) frame fields, interframe spacing information, and acknowledgment of transmitted frames. At high data rates, this overhead may consume more bandwidth than the payload data frame.

To address this issue, the 802.11n standard defines two types of frame aggregation: MAC service data unit (MSDU) aggregation and MAC protocol data unit (MPDU) aggregation. Both types group several data frames into one large frame. Since management information needs to be specified only once per frame, the ratio of payload data to the total volume of data is higher, thus allowing higher throughput.

In data transmission between two computing devices, such as an originator (AP or client device) and a responder (client device or AP), before the frames can be aggregated by the originator, a block acknowledgement session is required to be established between the originator and the responder. In an example, an access point, which attempts to establish the BA session with a client device, may be understood as the originator from which BA negotiations (or message exchange) arises and the client device may be understood as a responder which participates with the originator in the BA negotiations. Block Acknowledgement (BA) is an 802.11 MAC feature that increases throughput by decreasing protocol overhead. Instead of individually acknowledging each received frame, a single block acknowledgment frame can acknowledge multiple frames. In other words, through BA, multiple aggregated frames (such as Aggregated MPDUs or Aggregated MSDUs) can be acknowledged together using a single BA frame. This reduces the number of acknowledgement frames and corresponding interframe spaces, thereby increasing throughput. Once the BA session is successfully established, the originator may send aggregated frames to the responder.

The BA session generally consists of a setup phase, a data and block acknowledgement phase, and a tear-down phase. In the setup phase, the originator (say an AP) may send a request to establish the BA session, also called an ADDBA request, to the responder (say a client device). The responder may reply to the originator with an ADDBA successful response thereby successfully establishing the BA session.

The ADDBA request/response frames may include information about the capabilities of each participant and may be used to negotiate parameters of the BA session. In an example, a "BA Parameters Set" field in ADDBA frames is used to negotiate the parameters for setting up the BA session. The parameters of the BA session may include one or more traffic identifier (TID) values, A-MSDU Support, BA buffer size, one or more BA session timeout values, and BA policy. TID refers to a traffic classification indicating the relative priority level of traffic or data. More specifically, the TID indicates the priority level of the data, and may thus be mapped to a corresponding access category (AC). By classifying data according to its TID, the originator may aggregate data of the same priority level in a common set of AC queues. The aggregated data may be transmitted over a shared wireless medium as aggregated data frames such as, for example, Aggregated MPDUs (A-MPDUs) and/or aggregated MAC service data units (A-MSDUs). The "A-MSDU support" field determines whether an A-MSDU may be carried in a QoS data MPDU sent under this BA session. When equal to 1, use of A-MSDU is permitted. When equal to 0, use of A-MSDU is not permitted. The BA buffer size indicates the number of buffers available for a particular TID. In an example, when the "A-MSDU Support" field is equal to 0 as indicated by the originator transmitting the "BA Parameter set" fields, each buffer is capable of holding a number of octets equal to the maximum size of an MSDU. When "A-MSDU Support" field is equal to 1 as indicated by the originator transmitting the "BA Parameter set" fields, each buffer is capable of holding a number of octets equal to the maximum size of an A-MSDU that is supported by the originator. BA session timeout value may indicate a time interval for the BA session, after expiration of which without frame exchanges between the two wireless devices, the BA session may be terminated. In an example, BA session timeout values may be negotiated by configuring a default value for a BA inactivity timer. The BA inactivity timer may define a threshold time for which BA negotiation (message exchange) is allowed to remain idle. Thus, if during a BA negotiation, there is no message exchange between the originator and the responder for the threshold time defined by the BA inactivity timer, the BA session may be terminated. The BA policy field may be set to 1 for immediate Block Acknowledgement and to 0 for delayed Block Acknowledgement.

On receiving the ADDBA successful response by the originator, the BA session is successfully established and aggregated frames can be sent from the originator to the responder in the data and block acknowledgement phase. The originator may transmit a block of data frames, with the total number of frames not exceeding the "Buffer Size" subfield value in the associated ADDBA Response frame and subject to any additional duration limitations based on the channel access mechanism. In an example, each of the frames have the "Ack Policy" subfield in the QoS Control field set to Block Ack. The originator requests acknowledgment of outstanding data frames by sending a Basic Block Acknowledgement Request frame. The responder maintains a Block Acknowledgement record for the block. Thus, the originator may transmit blocks of frames and the responder may perform block acknowledgement of the transmitted frames during the data and block acknowledgement phase. In the tear-down phase, the BA session may be terminated or torn down by the originator by sending a Delete Block Acknowledgement (DELBA) frame to the responder. The responder on receiving of the DELBA frame may release all its computing resources allocated for the BA session.

Usually for implementing the BA session, a set-up timer is initialized at the originator. The set-up timer may define a threshold time for which the originator waits to receive a response to an ADDBA request. On expiry of the threshold time after sending the ADDBA request, the timer times out. The threshold time or time-out time of the set-up timer may be negotiated between the originator and the responder by exchanging the "BA parameters set" fields included in the ADDBA request/response messages. In some examples, after an ADDBA request is sent to the responder, a response to the ADDBA request may not be received in the threshold time. Delay in receipt of the response to the ADDBA request may occur due to poor response time of the responder, adverse channel conditions, etc.

In an instance, an ADDBA successful response may be received after the set-up timer has timed out. The receipt of the ADDBA successful response after time out of the set-up timer may lead to a confusion as to whether the BA session has been successfully established between the originator and the responder. In an instance, the responder may consider that the BA session is successfully established, since the responder has sent the ADDBA successful response to the originator. However, the originator may consider that the BA negotiation is unsuccessful, since it did not receive a response to the ADDBA request within the threshold time. Thus, the originator tries to renegotiate the BA session by sending a new ADDBA request. The responder may reject the new ADDBA request, since according to the responder the BA session is already established. Thus, the confusion regarding the state of the BA session between the originator and the responder may arise. Further, since the originator considers that the BA session is not established, the traffic is not aggregated from the originator thereby resulting in performance degradation. The originator may keep trying to renegotiate a BA session, which may be rejected by the responder. Thus, continuous data flowing from the originator to the responder, may not be aggregated until the connection resets.

Further, the BA inactivity timer is generally reset to its default value every time the responder receives an ADDBA request from the originator. Thus, when the set-up timer has timed out before receipt of the ADDBA successful response by the originator and the originator tries to renegotiate with the responder, every time the responder receives an ADDBA request from the originator, the BA inactivity timer is reset. In such a scenario, the BA inactivity timer is prevented from getting timed out owing to periodical ADDBA requests from the originator. Thus, the confusion regarding the state of the BA session remains. The responder considers the BA session to remain active and computing resources of the responder remain allocated for the BA session. However, traffic from the originator is not aggregated, since as per the originator, the BA session is not established as the ADDBA response was not received before time-out of the set-up timer. Thus, BA negotiation may get stuck in a loop where the originator tries to establish a new BA session and responder keeps rejecting it. As explained, the BA inactivity timer also does not help in such a scenario.

The present disclosure relates to techniques of BA negotiation where state of the responder is cleared if the originator clears its state, so that a new BA negotiation can occur between them, consequently preventing multiple rejections of BA negotiation attempts. According to the present disclosure, a first computing device (say an AP) sends a request to establish a BA session to a second computing device (say a client device). A timer may be initialized by the first computing device for receipt of a response to the request. The timer may define a threshold time for which the first computing device waits to receive a response to the request to establish the BA session. A BA successful response may be received by the first computing device from the second computing device, after the timer has timed out. Transmission of the BA successful response is indicative to the second computing device that the BA session is successfully established, while receipt of the BA successful response after the timer has timed out is indicative to the first computing device that the BA session has failed to establish. The first computing device sends a request to terminate the BA session to the second computing device. After the request to terminate is sent, the first computing device reinitiates a BA negotiation with the second computing device.

In the present disclosure, after the first computing device sends a request to terminate the BA session which the second computing device understands to be successfully established, the BA session may be terminated. After termination of the BA session, computing resources of the second computing devices associated with the BA session is released. Thus, the confusion regarding the state of the BA session between the first and second computing devices is resolved. This enables the first computing device to reinitiate BA negotiation with the second computing device with a higher chance of successfully establishing a new BA session and thereby reducing the number of BA rejection responses from the second computing device. Successfully establishing the new BA session enables frame aggregation and consequently provides higher throughput.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

The controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like. Client devices may also be referred to as stations (STA).

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in primary site 102 for client devices 110a-h. The APs 106a-c may control network access of the client devices 110a-h and may authenticate the client devices 110a-h for connecting to the APs and through the APs, to other devices within the network configuration 100. Each of APs 106a-c may be a combination of hardware, software, and/or firmware that is configured to provide wireless network connectivity to wireless client devices 110a-h. In the illustrated example, APs 106a-c can be managed and configured by the controller 104. APs 106a-c communicate with the controller 104 and the network over connections 112, which may be either wired or wireless interfaces. A switch 108 or AP 106a-c may participate in BA negotiation with a client device 110a-j to establish a BA session. In an example, a switch 108 or AP 106a-c may function as a computing device from which a request to establish a BA session, such as an ADDBA request, may originate and may be transmitted to a client device 110a-j. In the description of the present invention, a switch 108 or one of the APs 106a-c may also be referred as a first computing device and the client device 110a-j may be referred as a second computing device. Alternatively, the switches 108 or APs 106a-c may also receive a request to establish a BA session from a client device 110a-j.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140a-d.

In various embodiments, the remote site 132 may be in direct communication with primary site 102, such that client devices 140a-d at the remote site 132 access the network resources at the primary site 102 as if these clients devices 140a-d were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150a-b access the network 120. Such a remote site 142 may represent, for example, an individual employee's home or a temporary remote office. The remote site 142 may also be in communication with the primary site 102, such that the client devices 150a-b at remote site 142 access network resources at the primary site 102 as if these client devices 150a-b were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160a-b. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160a-b. Content servers 160a-b may include various providers of multimedia downloadable and/or streaming content, including audio, video, graphical, and/or text content, or any combination thereof. Examples of content servers 160a-b include, for example, web servers, streaming radio and video providers, and cable and satellite television providers. The client devices 110a-j, 140a-d, 150a-b may request and access the multimedia content provided by the content servers 160a-b.

Figure 2:
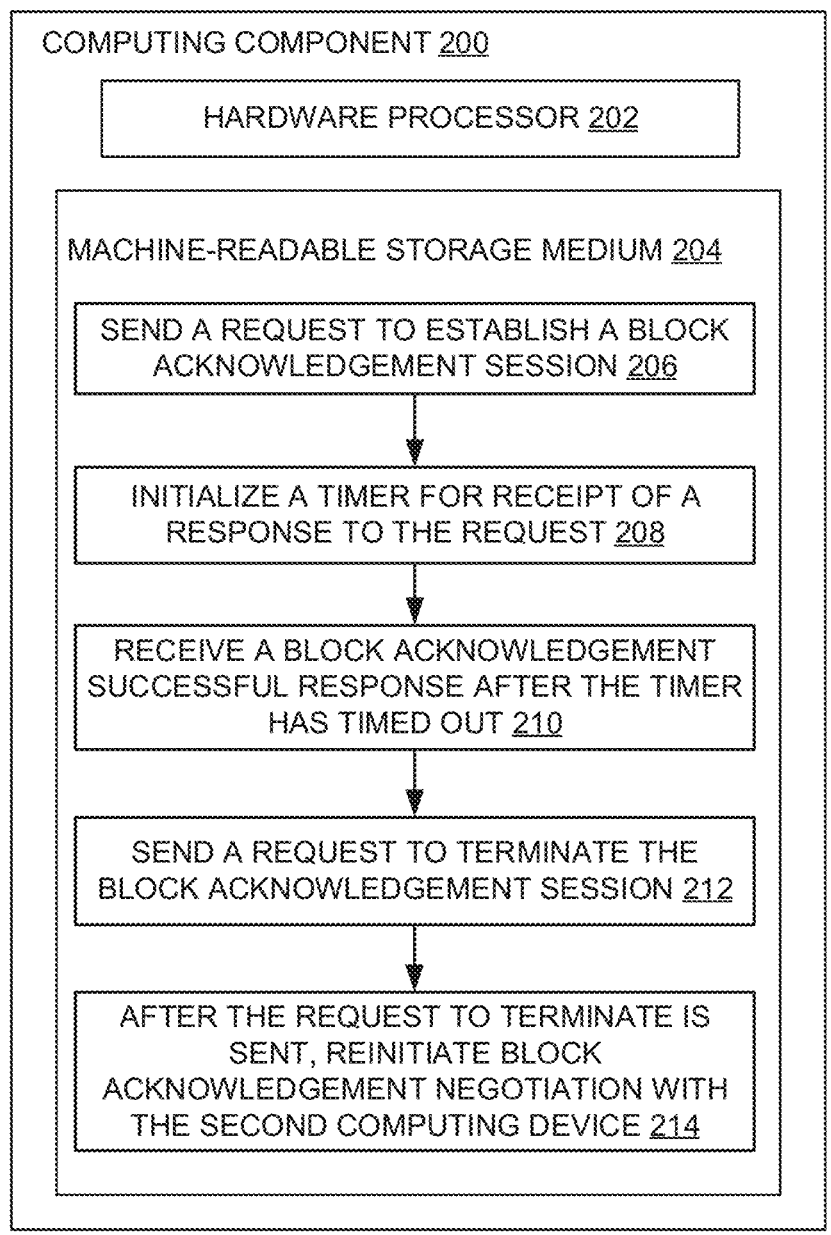
FIG. 2 is a block diagram of an example computing component or device for Block Acknowledgement negotiations in accordance with an embodiment.

FIG. 2 is a block diagram of an example computing component or device 200 for BA negotiations, in accordance with an embodiment. In an example, the computing component 200 may function as a network device, as referred to in embodiments described herein. Examples of the network device may include APs, layer 3 switches, and routers. In an example, the computing component 200 may function as a client device connecting to the network device.

In the example implementation of FIG. 2, the computing component 200 includes a hardware processor 202, and machine-readable storage medium, 204. Hardware processor 202 may be one or more central processing units (CPUs), semiconductor-based microprocessors, and/or other hardware devices suitable for retrieval and execution of instructions stored in machine-readable storage medium, 204. Hardware processor 202 may fetch, decode, and execute instructions, such as instructions 206-214, to control processes or operations for BA negotiations between two computing devices, such as a first computing device and a second computing device. As an alternative or in addition to retrieving and executing instructions, hardware processor 202 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 204, may be any electronic, magnetic, optical, or other physical storage device that contains or stores executable instructions. Thus, machine-readable storage medium 204 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 204 may be a non-transitory storage medium, where the term "non-transitory" does not encompass transitory propagating signals. As described in detail below, machine-readable storage medium 204 may be encoded with executable instructions, for example, instructions 206-214.

Further, although the steps shown in FIG. 2 are in an order, the shown order is not the only order in which the steps may be performed. Any step may be performed in any order, at any time, may be performed repeatedly, and/or may be performed by any suitable device or devices. The process shown in FIG. 2 is also discussed in FIG. 3, at a differing level of detail.

In step 206, the computing component/device 200 sends a request to establish a BA session to another computing device (not shown). The computing component/device 200 may be referred to as a first computing device and the other computing device may be referred to as a second computing device. The first computing device may be an AP and the second computing device may be a client device or vice versa. In an example, the first computing device may attempt to establish the BA session to start frame aggregation. In an instance, the second computing device may request to download a chunk/bulk of data packets via/from the first computing device. In response, the first computing device may send the request to establish the BA session to the second computing device to begin frame aggregation and enable faster download of the bulk of data packets. In an example, the request to establish the BA session may be an ADDBA request. The BA session includes the setup phase, a data and block acknowledgement phase, and the tear down phase. The request to establish the BA session may be sent during the set-up phase of the BA session.

In step 208, responsive to sending the request to establish the BA session, a timer for receipt of a response to the request is initialized by the first computing device. The timer may define a threshold time for which the first computing device waits to receive a response to the request to establish the BA session. In an example, the timer is a set-up timer. In an example, timing out of the timer before a response to the request is received by the first computing device, is indicative to the first computing device that the BA session is not successfully established.

In step 210, the first computing device receives a BA successful response from the second computing device after the timer has timed out. In an example, the BA successful response may be an ADDBA response having a status code "Successful". The status code is indicative of a state of the BA negotiation between the first and second computing devices. The "Successful" status code indicates that the ADDBA session is successfully established from the perspective of the second computing device. Thus, transmission of the BA successful response is indicative to the second computing device that the BA session is successfully established. However, receipt of the BA successful response after the timer has timed out is indicative to the first computing device that the BA session has failed to establish. Since, the timer has timed out before receipt of the response, the first computing device considers that the request to establish the BA session has failed.

In step 212, the first computing device sends a request to terminate the BA session to the second computing device. In an example, the request to terminate or tear down the BA session is a DELBA request. In an example, the second computing device on processing the DELBA request, may release computing resources allocated to a BA session associated with a particular TID thereby tearing down the BA session of that TID. In an example, the second computing device may clear "BA parameters set" field, including TID values, A-MSDU Support, BA buffer size, BA session timeout value(s), and BA policy, that were negotiated for the BA session associated with the particular TID. Thus, on processing the DELBA request, the second computing device may terminate BA Session(s) that may have been considered active by the second computing device.

In step 214, the first computing device may reinitiate BA negotiation with the second computing device after sending the request to terminate the BA session. Since, previously existing BA session(s) with the first computing device have been terminated by sending the DELBA request, the chances of rejection of a new ADDBA request due to preexisting BA session(s) may be reduced/eliminated. Thus, the reinitiated BA negotiation may enable in successfully establishing a new BA session between the first and second computing devices.

Figure 3:
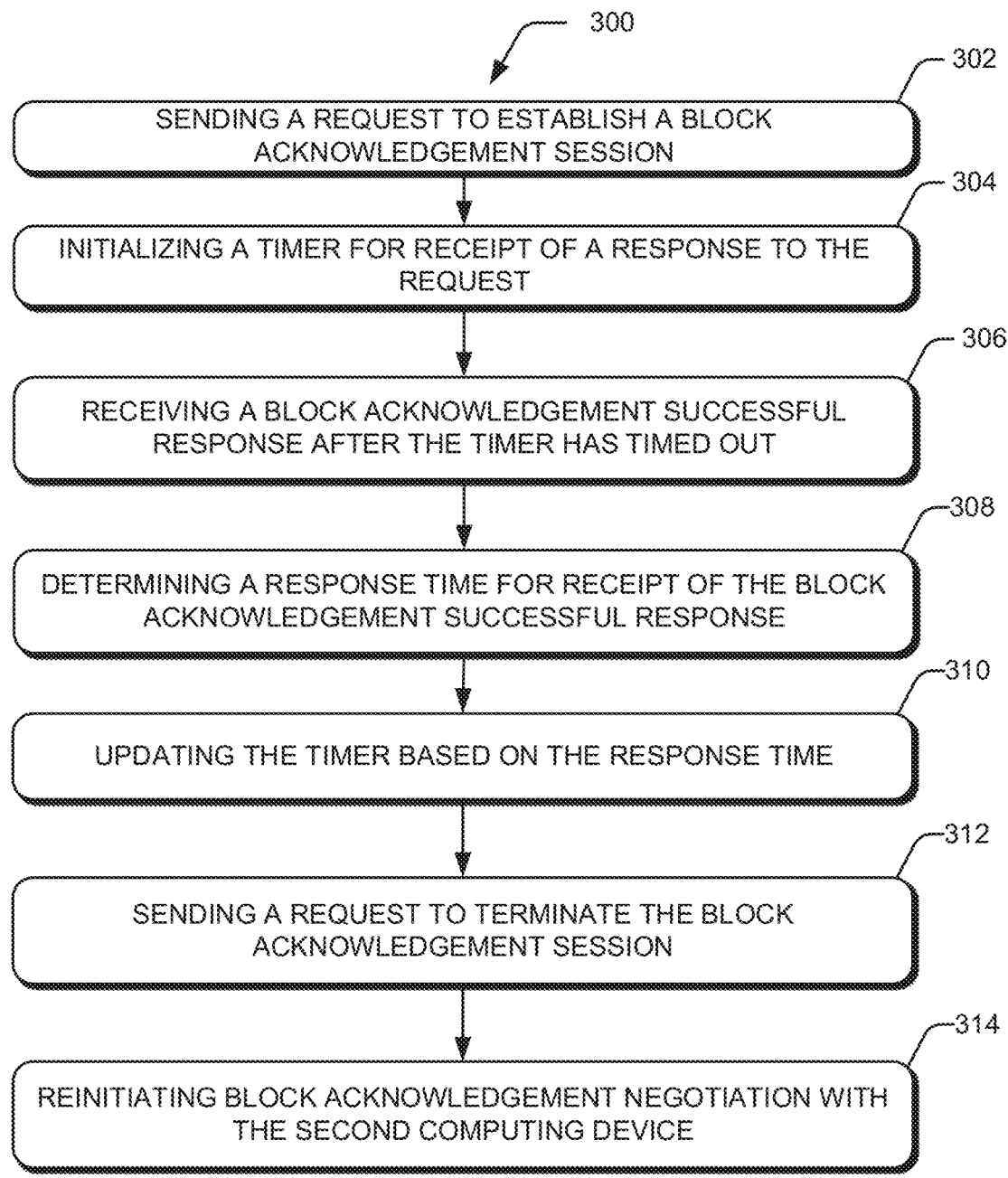
FIG. 3 illustrates an example method for Block Acknowledgement negotiations in accordance with an embodiment.

FIG. 3 illustrates an example method 300 for BA negotiation in accordance with an embodiment. The method 300 may be executed by a network device, such as an AP, switch, or router. Although in the examples described herein, it is considered that the method 300 is implemented by a network device, however, the method 300 may also be implemented by client devices, such as personal computers, laptops, smartphones, etc. The steps of the method 300 as described herein can be performed mutatis mutandis by a client device. The method 300 can be implemented by processing resource(s) or computing device(s) through any suitable hardware, a non-transitory machine readable medium, or combination thereof. In an example, the method 300 may be performed by computer-readable instructions, which include instructions stored on a medium and executable by a processing resource, such as the hardware processor 202, of a computing device/component, such as the computing component 200. Further, although the method 300 is described in context of the aforementioned computing component 200, other suitable systems may be used for execution of the method 300. It may be understood that processes involved in the method 300 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

Figure 4A:
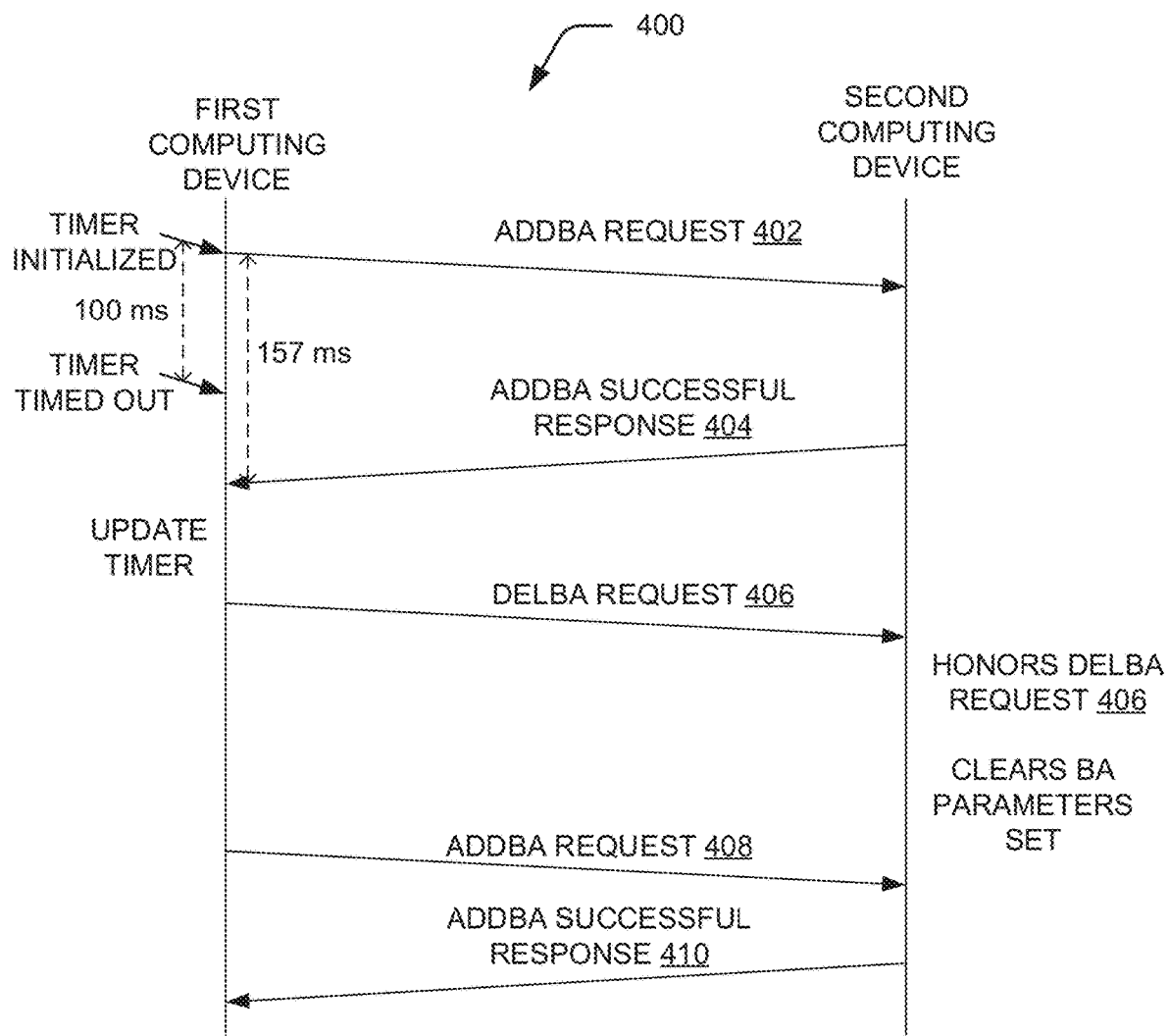
FIGS. 4A and 4B illustrates an example frame exchange for Block Acknowledgement negotiations between a first computing device and a second computing device, in accordance with an embodiment.
Figure 4B:
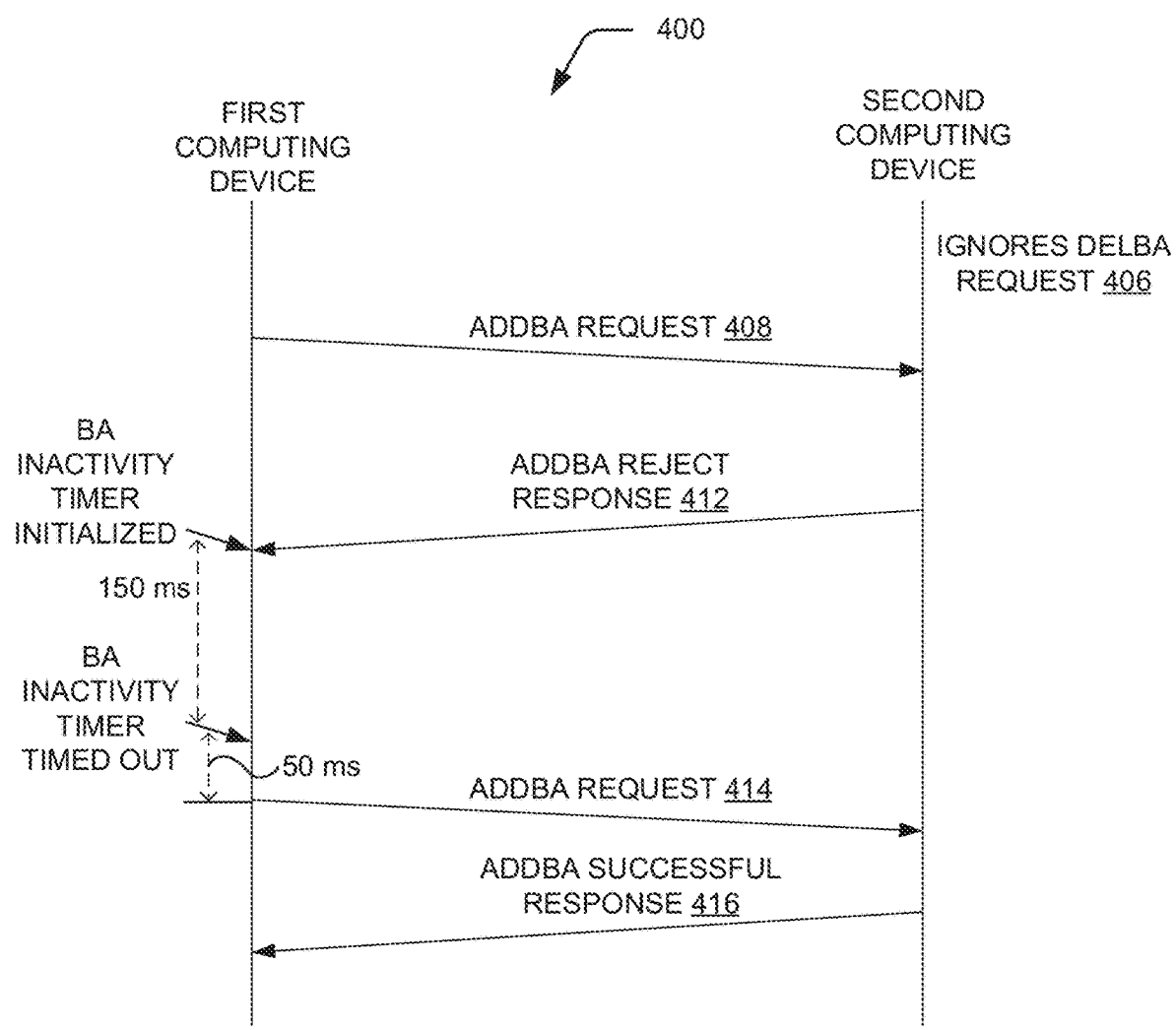

Referring to FIG. 3, at block 302, a first computing device, such as one of the APs 106a-c of FIG. 1, may send a request to establish a BA session to a second computing device, such as one of the client device 110a-j of FIG. 1. In an example, the AP 106a of FIG. 1 may generate an ADDBA request based on an input from a network administrator or responsive to receiving a download request from the second computing device, say the client device 110g. The download request may point to a network resource, including other devices on the (primary site 102) network and the network 120 of FIG. 1. The AP 106a may send the request to establish the BA session via a controller, such as the controller 104 of FIG. 1. FIGS. 4A and 4B illustrate an example frame exchange 400 for BA negotiation between the first computing device and the second computing device, in accordance with an embodiment. As shown in FIG. 4A, the first computing device sends an ADDBA request 402 to the second computing device.

Responsive to sending the request to establish the BA session, a timer is initialized at the first computing device, at block 304. The timer is for receipt of a response to the request. When initialized, the timer is set at a default threshold value, say 100 milliseconds (ms), which reduces gradually. The timer times out as the value of the timer reaches zero. As shown in FIG. 4A, the timer is initialized responsive to sending the ADDBA request 402 and the timer times out after the default threshold time of 100 ms. In an example, the timer may be implemented as a down counter which counts time in decreasing order.

At block 306, after the timer has timed out, a BA successful response is received by the first computing device from the second computing device. In an example, the first computing device receives an ADDBA successful response 404 after the timer has timed out, as shown in FIG. 4A.

At block 308, a response time for receipt of the BA successful response is determined by the first computing device. The response time refers to the time taken to receive the BA successful response after sending the request to establish the BA session. In the example of FIG. 4A, the response time may be determined as 157 ms. Based on the response time, the timer is updated by the first computing device, at block 310. Updation of the timer refers to modification of the value at which the timer is initialized when a request to establish a BA session is sent from the first computing device to the second computing device. In an example, the updated value of the timer is greater than the response time. In the example of FIG. 4A, the updated value of the timer may be 200 ms, i.e. greater than the response time of 157 ms. Once the timer is updated, the first computing device waits for a longer duration to receive a response to the request to establish the BA session. The BA negotiation may be reinitiated based on the updated timer. Thus, by waiting longer in subsequent BA negotiations the chance of establishing a successful BA session is increased.

At block 312, the first computing device sends a request to terminate the BA session to the second computing device. As shown in FIG. 4A, a DELBA request 406 is sent after receiving the ADDBA successful response 404. In an example, on receipt of the DELBA request 406, the second computing device may honor the DELBA request 406, as illustrated in FIG. 4A. In another example, the second computing device may ignore the DELBA request 406, as illustrated in FIG. 4B.

As shown in the example of FIG. 4A, on receipt of the request to terminate the BA session, the second computing device may clear "BA parameters set" and other information associated with the BA session of the particular TID and consequently may be ready to renegotiate with the first computing device to establish a new BA session. In an example, on receipt of the request to terminate the BA session, the second computing device may release its computing resources allocated to the BA session. The first computing device may send a renegotiation request to establish the BA session with the second computing device. As shown in FIG. 4A, the first computing device may send an ADDBA request 408 after the DELBA request 406. Thus, the first computing device, reinitiates BA negotiation with the second computing device at block 314 of FIG. 3. In an example, the second computing device may respond with a renegotiation successful response indicative of successfully establishing the BA session. As shown in FIG. 4A, the second computing device may send an ADDBA successful response 410, thereby successfully establishing the BA session between the first and second computing devices.

As shown in the example of FIG. 4B, on receipt of the request to terminate the BA session, the second computing device may ignore the request to terminate. The second computing device may ignore the DELBA request 406, as illustrated in FIG. 4B. Thus, from the perspective of the second computing device a BA session may exist between the first and second computing devices, even after receipt of the DELBA request 406. When the first computing device sends the renegotiation request, such as the ADDBA request 408 of FIG. 4B, the second computing device may respond with a rejection response to the renegotiation request. The renegotiation request may also be referred to as the first renegotiation request. In an example, the rejection response may be an ADDBA reject response 412 of FIG. 4B. In an example, the rejection response may be an ADDBA response with a status code "Reject" indicating that the renegotiation request (ADDBA request) has been rejected by the second computing device.

On receipt of the rejection response to the first renegotiation request, the first computing device may initialize a BA inactivity timer indicative of a threshold time for which BA negotiation remains idle. When initialized, the BA inactivity timer is set at a default threshold value, say 150 milliseconds (ms), which reduces gradually. The timer times out as the value of the timer reaches zero. As shown in FIG. 4B, the BA inactivity timer is initialized responsive to the first computing device receiving the ADDBA reject response 412 and the timer times out after the default threshold time of 150 ms. In an example, the BA inactivity timer may be implemented as a down counter which counts time in decreasing order. The first computing device is configured to wait for the BA inactivity timer to time out before sending a new request to establish a BA session. In an example, the first computing device may wait for a predefined time period (say 50 milliseconds) more than a time duration corresponding to the time out of the BA inactivity timer, as shown in FIG. 4B.

In an example, responsive to timing out of the BA inactivity timer, the first computing device sends a second renegotiation request to the second computing device. The second renegotiation request may be ADDBA request 414, as shown in FIG. 4B. Since, the first computing device waits for a time interval more than or equal to that of the BA inactivity timer before sending the second renegotiation request, any existing BA sessions between the first and second computing devices may be terminated. Thus, by the time the second renegotiation request is sent to the second computing device, the second computing device is available for participating in fresh BA negotiation with the first computing device.

In an example, a renegotiation successful response may be received, by the first computing device from the second computing device, in response to the second renegotiation request. As shown in FIG. 4B, the renegotiation successful response may be an ADDBA successful response 416. The ADDBA successful response 416 is indicative to the first and second computing devices that the BA session is successfully established.

Responsive to successfully establishing the BA session, the timer for receipt of a response to the request to establish the BA session (such as an ADDBA request) is set to a default value. In an example, the timer is the set-up timer which may be set to the default threshold value. Setting the timer to the default threshold value includes changing the threshold time for which the first computing device is to wait for a response to an ADDBA request from the updated threshold time to the default threshold time.

Figure 5:
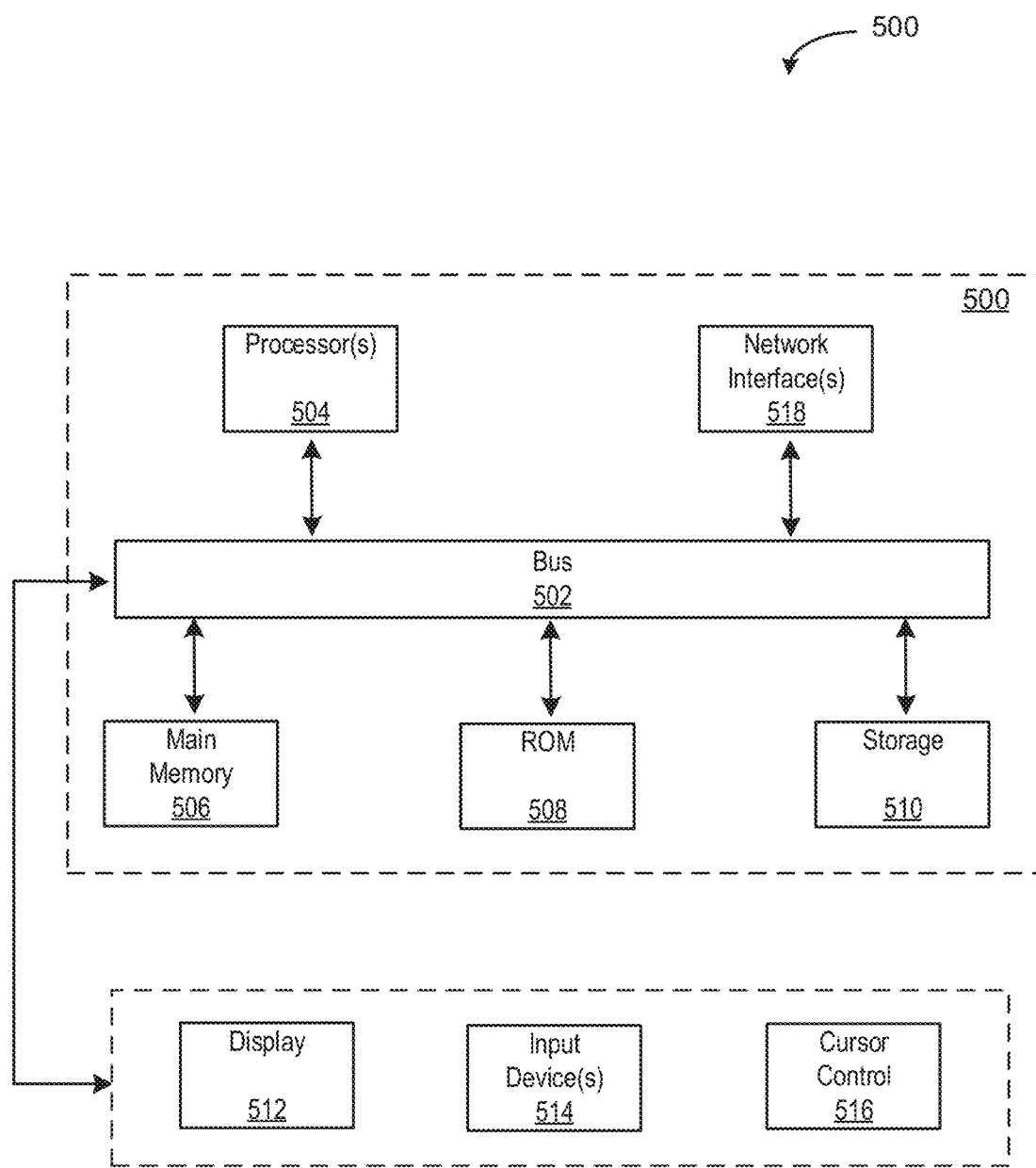
FIG. 5 depicts a block diagram of an example computer system in which the embodiments described herein may be implemented.

FIG. 5 depicts a block diagram of an example computer system 500 in which the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518. The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

Although implementations of present subject matter have been described in language specific to structural features and/or methods, it is to be noted that the present subject matter is not necessarily limited to the specific features or methods described. Rather, the specific features and methods are disclosed and explained in the context of a few implementations for the present subject matter.

We claim:

1. A method for block acknowledgement (BA) negotiation, comprising:
   sending, by a first computing device to a second computing device, a request to establish a BA session;
   initializing, by the first computing device, a timer for receipt of a response to the request;
   receiving, by the first computing device from the second computing device, a BA successful response after the timer has timed out, wherein transmission of the BA successful response is indicative to the second computing device that the BA session is successfully established, and wherein receipt of the BA successful response after the time out is indicative to the first computing device that the BA session has failed to establish;
   sending, by the first computing device to the second computing device, a request to terminate the BA session;
   after sending the request to terminate the BA session, sending, by the first computing device to the second computing device, a first renegotiation request to establish the BA session;
   receiving, by the first computing device from the second computing device, a rejection response to the first renegotiation request;
   initializing, by the first computing device, a BA inactivity timer indicative of a threshold time for which BA negotiation remains idle;
   responsive to timing out of the BA inactivity timer, sending, by the first computing device to the second computing device, a second renegotiation request; and
   receiving, by the first computing device from the second computing device, a renegotiation successful response to the second renegotiation request.

2. The method of claim 1, further comprising:
   determining, by the first computing device, a response time for receipt of the BA successful response; and
   updating, by the first computing device and based on the response time, the timer, wherein the BA negotiation is reinitiated based on the updated timer.

3. The method of claim 1, wherein the timer is set to a default value, responsive to successfully establishing the BA session.

4. The method of claim 1, wherein the request to establish the BA session is an Add Block Acknowledgement (ADDBA) request.

5. The method of claim 1, wherein the request to terminate the BA session is a Delete Block Acknowledgement (DELBA) request.

6. An access point comprising:
   a processor; and
   a memory coupled to the processor, the memory storing instructions executable by the processor to:
   send, to a client device, a request to establish a BA session;
   initialize a timer for receipt of a response to the request;
   receive, from the client device, a BA successful response after the timer has timed out, wherein transmission of the BA successful response is indicative to the client device that the BA session is successfully established, and wherein receipt of the BA successful response after the time out is indicative to the access point that the BA session has failed to establish;
   send, to the client device, a request to terminate the BA session;
   after the request to terminate is sent, send, to the client device, a first renegotiation request to establish the BA session;
   receive, from the client device, a rejection response to the first renegotiation request;
   initialize a BA inactivity timer indicative of a threshold time for which BA negotiation remains idle;
   responsive to timing out of the BA inactivity timer, send, to the client device, a second renegotiation request; and
   receive, from the client device, a renegotiation successful response to the second renegotiation request.

7. The access point of claim 6, wherein the processor is further to:
   determine response time for receipt of the BA successful response; and
   update, based on the response time, the timer, wherein the BA negotiation is reinitiated based on the updated timer.

8. The access point of claim 6, wherein the timer is set to a default value, responsive to successfully establishing the BA session.

9. The access point of claim 6, wherein the request to establish the BA session is an Add Block Acknowledgement (ADDBA) request.

10. The access point of claim 6, wherein the request to terminate the BA session is a Delete Block Acknowledgement (DELBA) request.

11. The access point of claim 6, wherein the access point and client device communicates over the IEEE 802.11 protocol.

12. A non-transitory computer-readable medium comprising computer-readable instructions, the computer-readable instructions when executed by a processor, cause the processor to:
- send, to a client device, a request to establish a BA session;
- initialize a timer for receipt of a response to the request;
- receive, from the client device, a BA successful response after the timer has timed out, wherein transmission of the BA successful response is indicative to the client device that the BA session is successfully established, and wherein receipt of the BA successful response after the time out is indicative to the access point that the BA session has failed to establish;
- send, to the client device, a request to terminate the BA session;
- after the request to terminate is sent, send, to the client device, a first renegotiation request to establish the BA session;
- receive, from the client device, a rejection response to the first renegotiation request;
- initialize a BA inactivity timer indicative of a threshold time for which BA negotiation remains idle;
- responsive to timing out of the BA inactivity timer, send, to the client device, a second renegotiation request; and
- receive, from the client device, a renegotiation successful response to the second renegotiation request.

13. The non-transitory computer-readable medium of claim 12, wherein the computer-readable instructions, further cause the processor to:
- determine response time for receipt of the BA successful response; and
- update, based on the response time, the timer, wherein the BA negotiation is reinitiated based on the updated timer.

14. The non-transitory computer-readable medium of claim 12, wherein the request to establish the BA session is an Add Block Acknowledgement (ADDBA) request.

* * * * *